United States Patent
Wagle et al.

(10) Patent No.: US 12,292,649 B2
(45) Date of Patent: May 6, 2025

(54) LOCAL DIMMING SYSTEM FOR HEAD UP DISPLAY

(71) Applicant: N.S. International, Ltd., Troy, MI (US)

(72) Inventors: Saumil Satish Wagle, Mumbai (IN); Yasuhiro Suzuki, Troy, MI (US); Arul Krishna, West Bloomfield, MI (US); Joe Pullukat, Troy, MI (US)

(73) Assignee: N.S. International, Ltd., Troy, MI (US)

( * ) Notice: Subject to any disclaimer, the term of this patent is extended or adjusted under 35 U.S.C. 154(b) by 0 days.

(21) Appl. No.: 18/215,415

(22) Filed: Jun. 28, 2023

(65) Prior Publication Data

US 2023/0418106 A1    Dec. 28, 2023

Related U.S. Application Data

(60) Provisional application No. 63/356,271, filed on Jun. 28, 2022.

(51) Int. Cl.
*G02B 27/01* (2006.01)
*G02F 1/1335* (2006.01)
*G02F 1/13357* (2006.01)

(52) U.S. Cl.
CPC ... *G02F 1/133607* (2021.01); *G02B 27/0101* (2013.01); *G02F 1/133603* (2013.01); *G02B 2027/0118* (2013.01)

(58) Field of Classification Search
None
See application file for complete search history.

(56) References Cited

U.S. PATENT DOCUMENTS

| | | | |
|---|---|---|---|
| 7,095,562 B1 | 8/2006 | Peng et al. | |
| 7,513,668 B1 | 4/2009 | Peng et al. | |
| 8,581,837 B2 | 11/2013 | Amroun et al. | |
| 2007/0064174 A1 | 3/2007 | Kitamura et al. | |
| 2019/0278081 A1 | 9/2019 | Kuo et al. | |
| 2020/0174279 A1 | 6/2020 | Ishihara et al. | |
| 2021/0379993 A1 | 12/2021 | Xu et al. | |

FOREIGN PATENT DOCUMENTS

| | | |
|---|---|---|
| CN | 111025642 | 4/2020 |
| CN | 111142259 | 5/2020 |
| CN | 112346271 | 2/2021 |
| WO | 2014041690 | 3/2014 |
| WO | 2018139157 | 8/2018 |
| WO | 2019212633 | 11/2019 |
| WO | 2019225572 | 6/2021 |
| WO | 2021160325 | 8/2021 |

*Primary Examiner* — Thanh Nhan P Nguyen
(74) *Attorney, Agent, or Firm* — Clark Hill PLC (57) ABSTRACT

A local dimming system for a head up display (HUD) according to the present invention comprises a light array, a Fresnel lens array, a lenticular lens system, and a liquid crystal display (LCD). The Fresnel lens array is operatively associated with the light array to provide a collimated backlight output to produce an image on the LCD. The Fresnel lens array focuses light from the light array while reflecting stray light, eliminating light bleed and reducing or eliminating a display-boundary or "postcard effect." The Fresnel lens array is compact to enable HUD packaging necessary to configure the HUD for use in vehicles, while also removing the need for reflectors which create shadows on the LCD.

22 Claims, 9 Drawing Sheets

LOCAL DIMMING SYSTEM FOR HEAD UP DISPLAY

CROSS REFERENCE TO RELATED APPLICATIONS

This application claims priority to United States Utility Provisional Application No. 63/356,271 filed on Jun. 28, 2022, which is hereby incorporated by reference in its entirety for all purposes.

TECHNICAL FIELD

The present disclosure relates generally to the field of head up displays (HUD). More specifically, the present disclosure relates to local dimming systems to remove or minimize a "postcard effect" in the displays.

BACKGROUND

The use of a head up display (HUD) in vehicles is known in the prior art. A HUD is a means of projecting an image directly into a user's visual field in such a way as to overlap a background scene without interfering with the user's view of the background scene. In automobiles, this generally means that information contained in the image is projected onto a portion of a vehicle's windshield in a semi-transparent manner so that a vehicle driver can quickly and easily acquire information such as, but not limited to, speed, navigation assistance, engine performance, and operating conditions, without directing the driver's attention away from the road.

Generally, HUDs utilize light-emitting diodes (LEDs) and a set of lenses to generate an image on a liquid crystal display (LCD). However, the process of the light passing through and/or reflected off lenses and other portions of the HUD on its way to the windshield is not very efficient. Thus, high power LEDs are frequently used to provide sufficient backlight intensity for the image to be visible to the vehicle driver. However, these high-power LEDs result in a compromised contrast ratio in the image where unlit areas of the image appear gray. This is known as the "postcard effect" where a gray HUD display boundary is visible on the windshield. The "postcard effect" is unattractive and annoying to drivers. Furthermore, the display boundary can impede the driver's view and can be distracting Several designs have been considered in attempts to resolve the issue of the "postcard effect." These designs utilize an increased number of LEDs and apply selective operation of LEDs whereby individual LEDs are turned on so as to be active, and the remainder of the LEDs are turned off so as to be inactive. The increased number of LEDs and the selective activation and deactivation of the LEDs results in a plurality of lighting zones on the LCD, one for each LED. Each of these lighting zones may be lit or unlit, depending on whether its corresponding LED is active or inactive. In such instances, the lit lighting zones of the LCD correspond with areas of the LCD where the image produced by the LEDs is displayed, and the unlit lighting zones correspond to blank or empty space within the image. To achieve this, it is important that the homogeneity of each lighting zone is enhanced so that the lighting zones are as uniform as possible. As a result, areas of the LCD that do not present a graphic or information are not lit with light from the LEDs.

However, HUDs with selective operation of LEDs still exhibit the "postcard effect" due to light bleed from the active LEDs into the unlit lighting zones of the LCD. One approach to address this issue utilizes a plurality of condenser lenses, such as aspheric lenses, that collimates light from the LED and reduces stray light. These condenser lenses are used in collaboration with lenticular lenses to improve the HUD image. However, the condenser lenses are large and are restrictive from a packaging perspective for compact HUD units used in vehicles. Moreover, because the condenser lenses are large, and take up more space than some alternatives, they typically overlay multiple LEDs. Thus, to light up a single lens in a condenser array, multiple LEDs would need to be lit, defeating the purpose of selective lighting.

Alternatively, some designs utilize reflectors or baffles between the LEDs to reflect stray light back to the LED. However, this method can be even more inefficient than a typical HUD because a major portion of the emitted light is not guided to the LCD. Furthermore, the reflectors extend between the LEDs toward the projected image and a top portion of the reflectors can cause shadows on the image, creating larger transitions between lighting zones on the LCD and resulting in a non-uniform image.

Further alternatives do not use reflectors or lenses, but instead utilize light guiding diffusers to evenly spread the light. However, LEDs in this alternative must be at least twice as powerful as a typical HUD, decreasing efficiency. Moreover, the use of a light guiding diffuser is not as effective as the use of lenses and still results in significant light-bleed due to uncontrolled light emission.

Accordingly, there is an unmet need for a HUD comprising a local dimming system that resolves the foregoing problems in the prior art.

SUMMARY

In one embodiment, the present disclosure provides a local dimming system for a heads-up display (HUD) for use in a vehicle, wherein a display boundary is not visible on a windshield or other comparable reflective surface on which a display is provided. The present disclosure preferably includes a light array, a Fresnel lens array, a lenticular lens system comprising an alignment feature to ensure a uniform spread of light, and a liquid crystal display (LCD). The light array may be a high-power light array. The light array comprises a plurality of individual light sources, such as light-emitting diodes (LEDs), from which light is reflected through the Fresnel lens array and the lenticular lens system (alignment feature) to produce an image via backlight upon the LCD. Each of the plurality of individual light sources can be selectively active or inactive to produce localized dimming of the backlight projected onto the LCD. The lenticular lens system preferably comprises at least one lenticular lens. In some embodiments, the lenticular lens system additionally comprises a light guiding diffuser.

This selective activation of the members of the plurality of independent light sources creates active independent light sources, inactive independent light sources, and active independent light sources that are neighboring to inactive independent light sources. Each individual light source preferably corresponds to a lighting zone on the LCD. Light from the active light sources can bleed over onto the lighting zones that correspond to inactive independent light zones. To address this, the Fresnel lens array focuses light produced from the active individual light sources without reflecting or directing light to neighboring light zones. In a preferred embodiment, the Fresnel lens array is provided in a "sheet" of Fresnel lenses, wherein each individual light source is preferably associated with one Fresnel lens on the Fresnel lens sheet. The plurality of individual light sources, focused through the Fresnel lens array, defines a plurality of lighting zones on the LCD, one for each individual light source and Fresnel lens pair.

The Fresnel lens array eliminates light bleed between neighboring independent light sources, minimizing or eliminating the display-boundary that creates a "postcard effect" on the LCD. Furthermore, the Fresnel lens array is compact, and results in a smaller package size than condenser lenses such as aspheric lenses. Moreover, the use of a Fresnel lens array eliminates the display-boundary without the use of reflectors, resulting in an image without shadows on the LCD thereby minimizing or eliminating transitions between lighting zones. This in turn facilitates a more efficient, compact HUD with a brighter and more even image on the LCD.

A preferred embodiment of the present invention comprises:

A local dimming system of a head up display (HUD), the local dimming system comprising:
- a light array;
- a Fresnel lens array;
- a lenticular lens system; and
- a liquid crystal display (LCD);
- wherein the Fresnel lens array is operatively connected to the high-power light array, configured to receive light produced by the high-power light array, and configured to produce a collimated backlight output;
- wherein the lenticular lens system is operatively connected to the Fresnel lens array, configured to receive the collimated backlight-output from the Fresnel lens array, and configured to transmit light to the LCD;
- wherein the LCD is configured to receive the light from the lenticular lens system and produce an image; and
- wherein the Fresnel lens array is configured to reflect stray light and eliminate light bleed, thereby reducing or eliminating a display-boundary around the image.

BRIEF DESCRIPTION OF THE DRAWINGS

The invention will be more fully understood by referring to the following Detailed Description of Specific Embodiments in conjunction with the Drawings, of which.

DETAILED DESCRIPTION OF SPECIFIC EMBODIMENTS

Embodiments of the present invention relate generally to a local dimming system for a head up display (HUD). The present disclosure describes, in detail, a specific embodiment with the understanding that the present invention may be susceptible to embodiments in different forms, and that the present disclosure is considered an exemplification of the principles of the invention and is not intended to limit the invention to that described herein.

A HUD is a means of projecting an image directly into a user's visual field in such a way as to overlap a background scene without interfering with the user's view. In vehicles such as a car, truck, or other automobile, this generally means that information contained in the image is projected onto a portion of a vehicle's windshield 14, or other suitable reflective surface, in a semi-transparent manner so that a driver can quickly and easily acquire information such as, but not limited to, speed, navigation assistance, engine performance, and operating conditions, without directing the driver's attention away from a road or other background.

Figure 1:
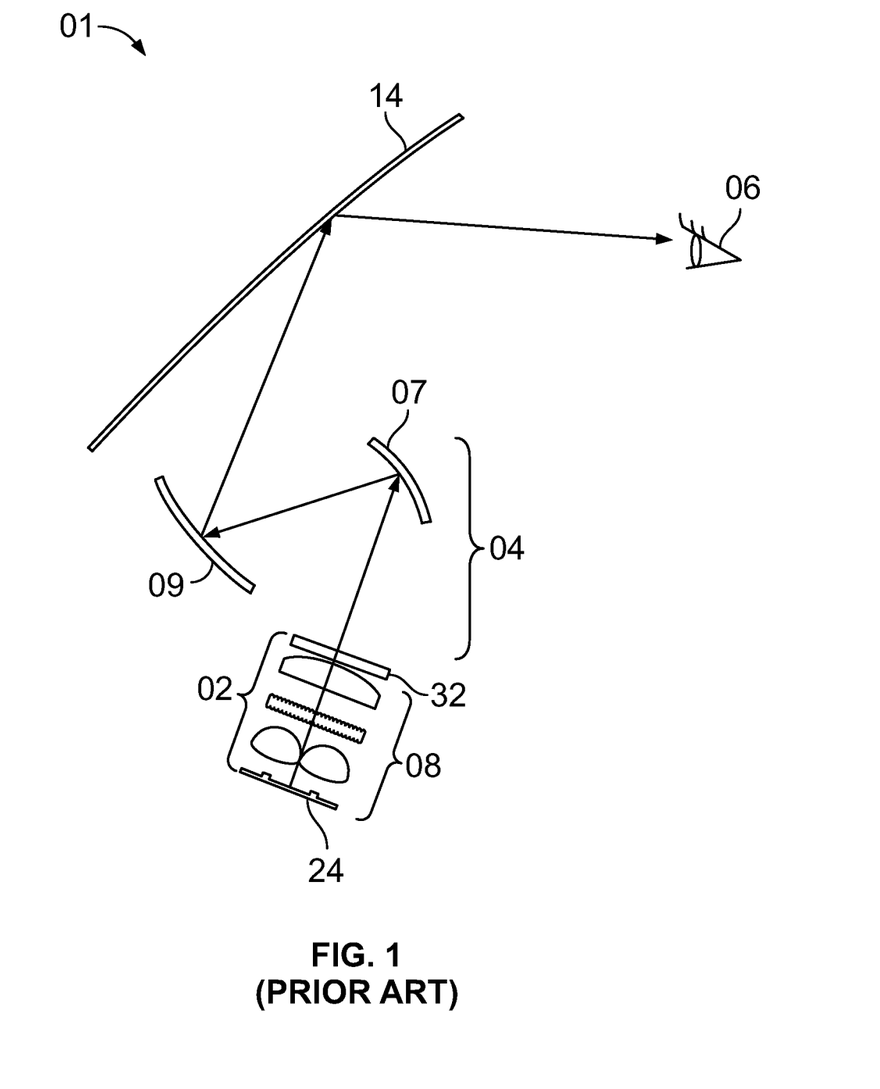
FIG. 1 is a perspective view of a head up display (HUD) according to the prior art.
Figure 3:
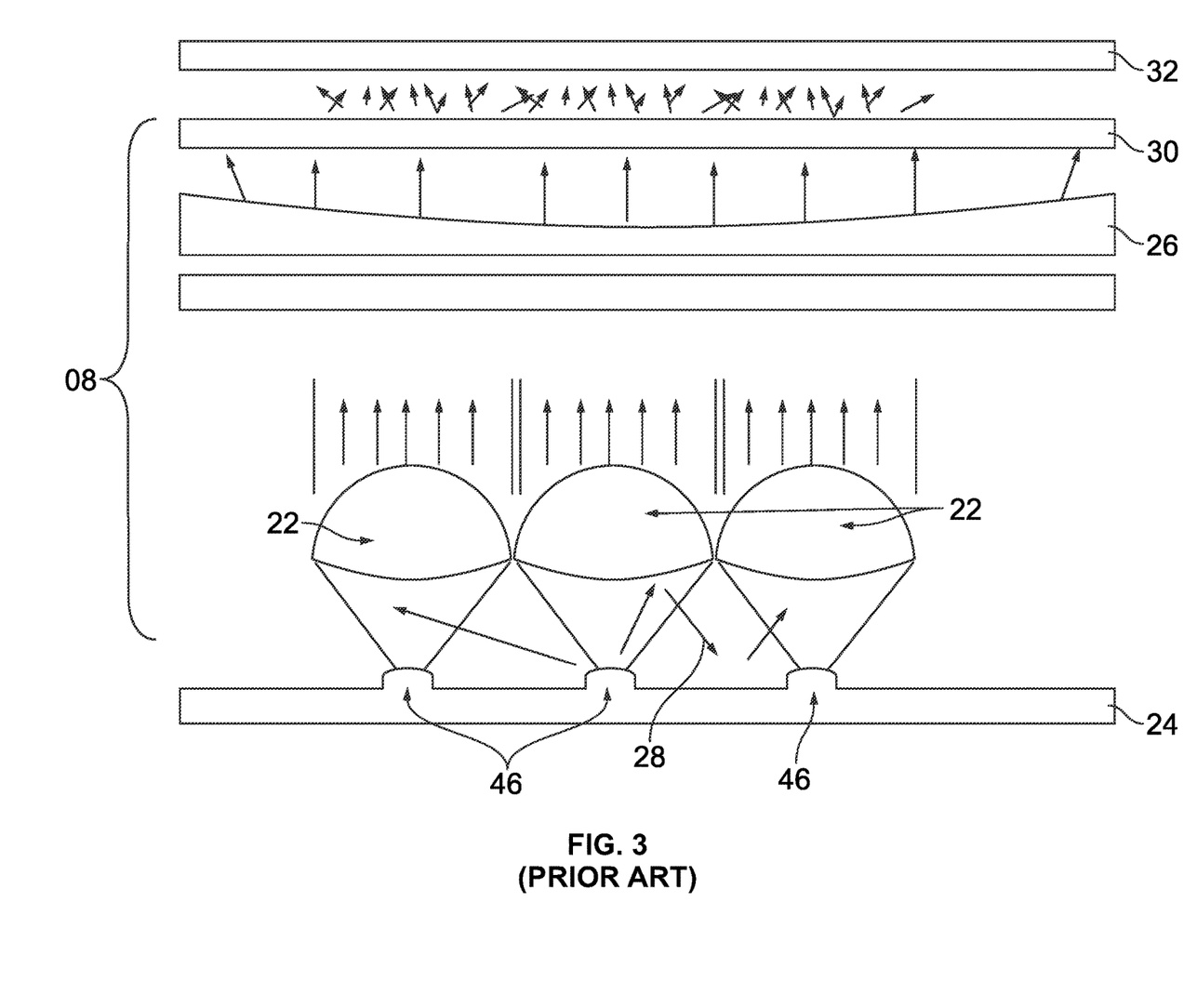
FIG. 3 is a schematic of HUD components utilizing condenser lenses to reduce light bleed, in accordance with the prior art.
Figure 4:
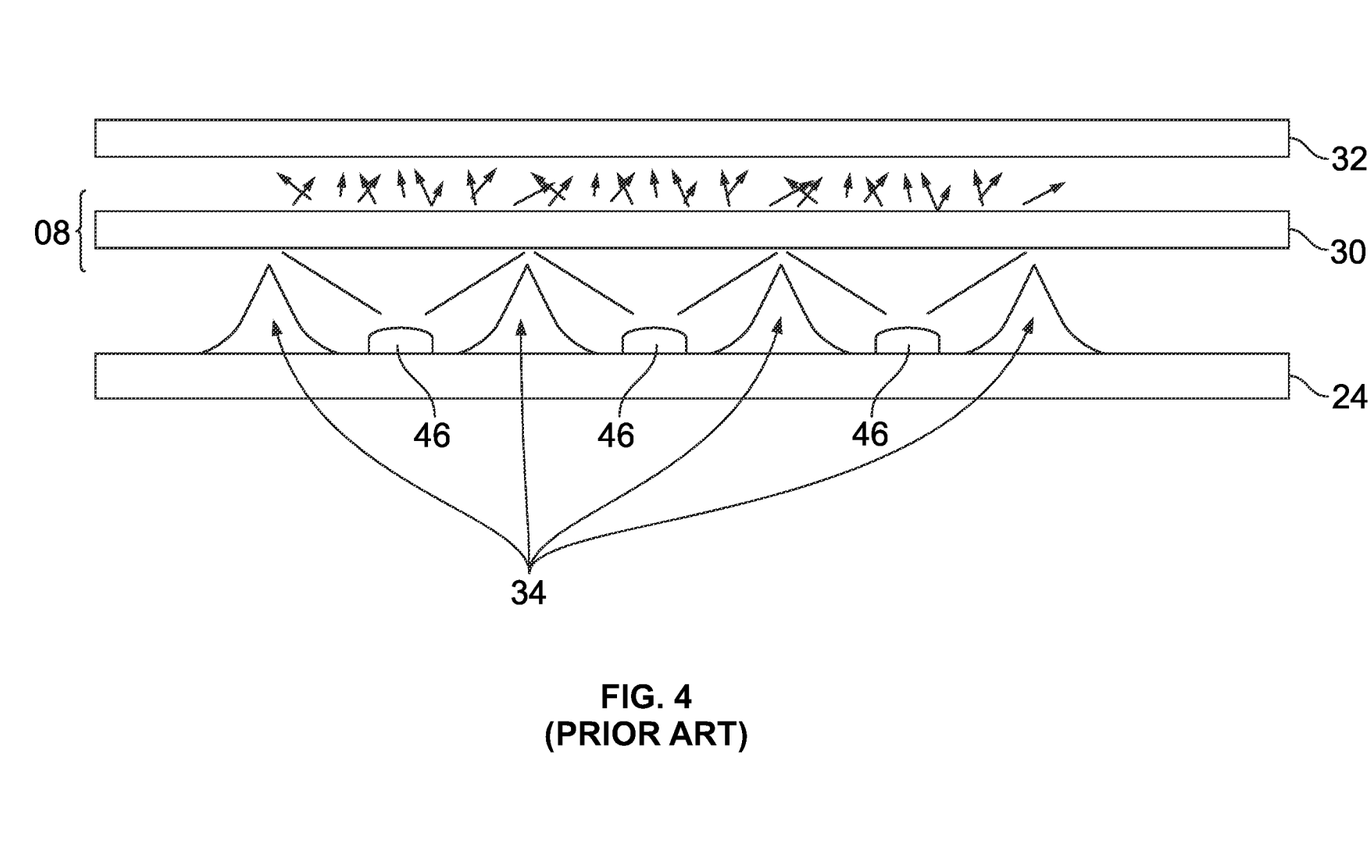
FIG. 4 is a schematic of HUD components utilizing reflective optics, or reflectors, to reduce light bleed, provided in accordance with the prior art.
Figure 5:
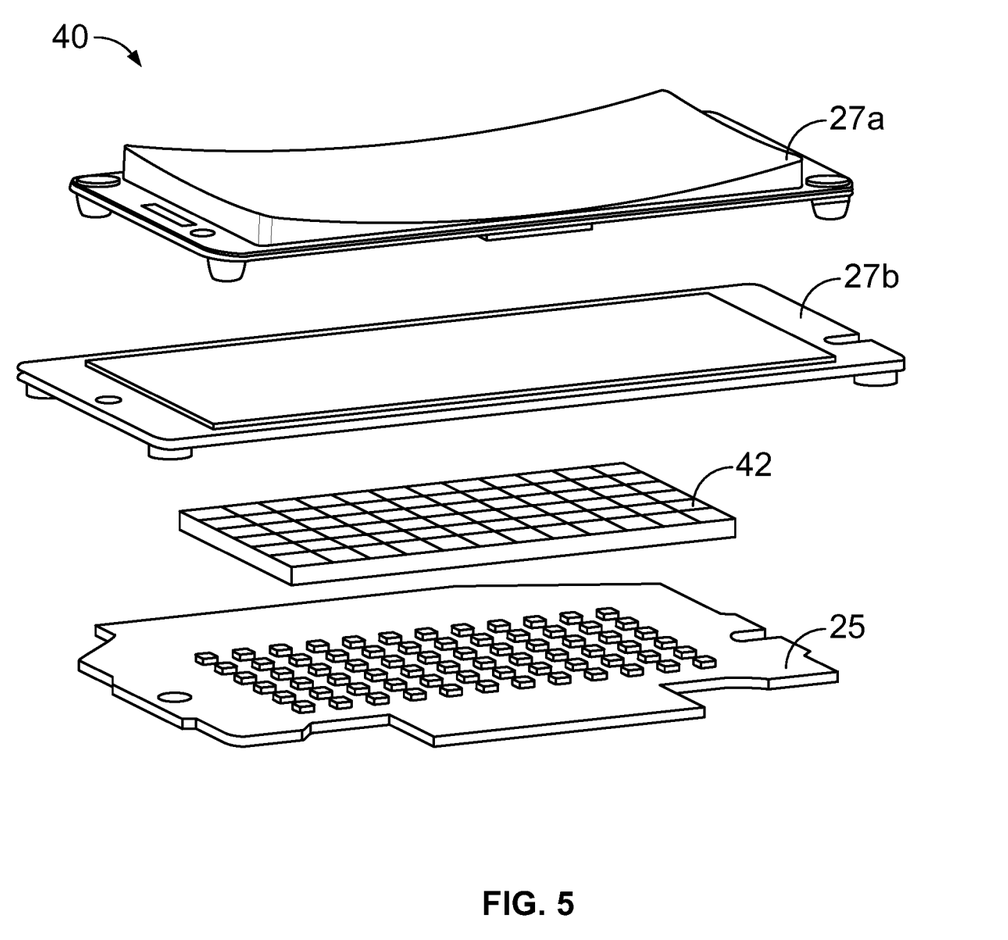
FIG. 5 is an exploded perspective view of a local dimming system in a HUD, provided in accordance with an embodiment of the present disclosure.
Figure 6:
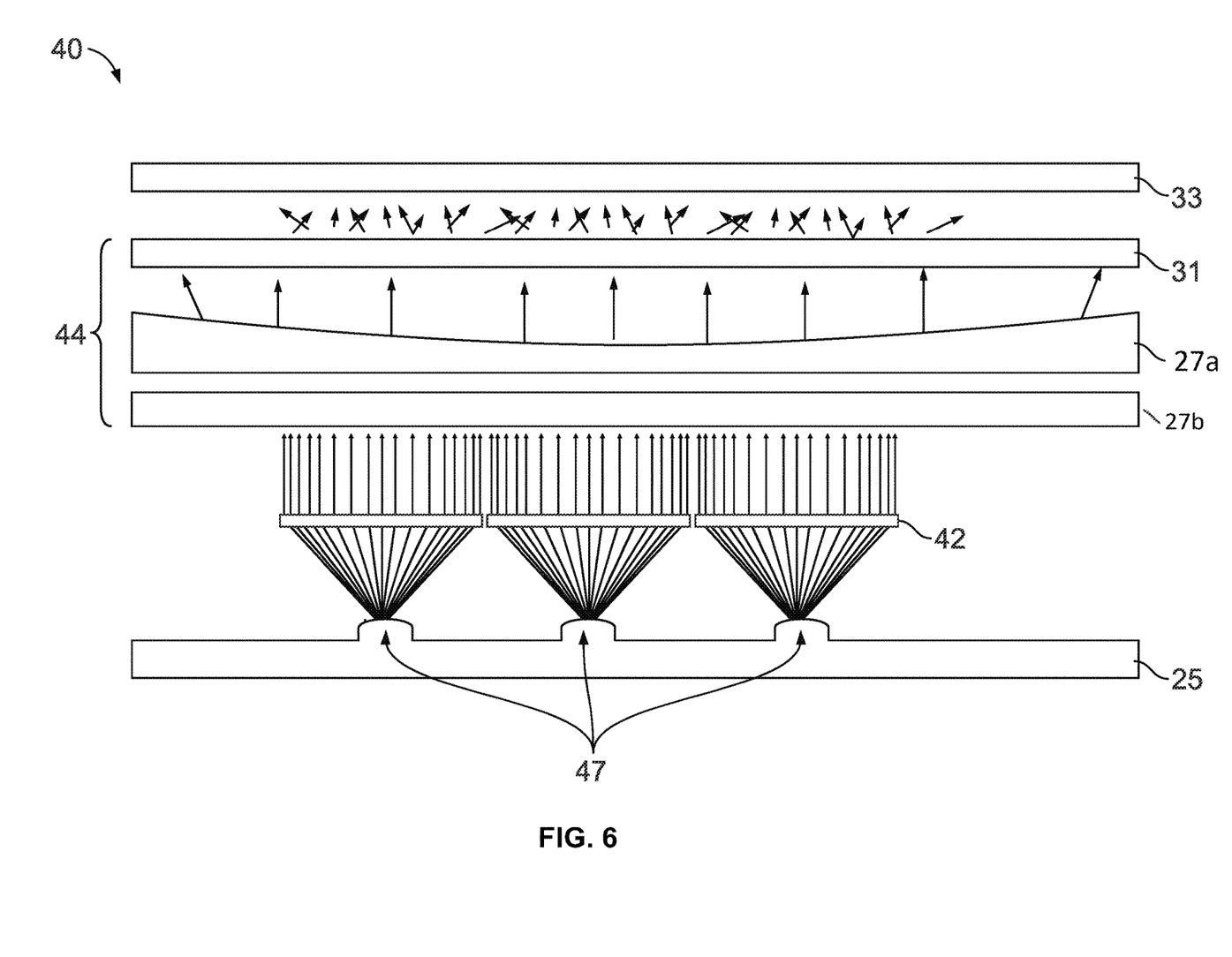
FIG. 6 is a schematic of the local dimming system components within the HUD of FIG. 5, provided in accordance with an embodiment of the present disclosure.

As generally shown in FIG. 1, HUDs 01 typically comprise an imaging system 02 and a plurality of mirrors and/or lenses 04 to display an image on a windshield 14 or other reflective surface for view by a user 06. The plurality of mirrors and/or lenses may comprise a fold mirror 07 and a concave mirror 09, in accordance with the prior art. Traditional imaging systems 02 generally comprise a light array 24, a plurality of lens arrays and/or light diffusers 08, and a liquid crystal display (LCD) 32. In traditional imaging systems, the light array 24 produces a light output which is focused, collimated, and/or refined by the plurality of lens arrays and/or light diffusers 08 to produce an image on the LCD 32. Collimated light, as used in this disclosure, refers to light that has parallel rays to minimize spread of light, or light blead, to areas where illumination is not desired. Schematics of two different imaging systems utilized in the prior art are illustrated in FIGS. 3 and 4. The present invention primarily pertains to a novel and inventive improvement of an imaging system of a HUD, as illustrated in FIGS. 5 and 6.

Figure 2A:
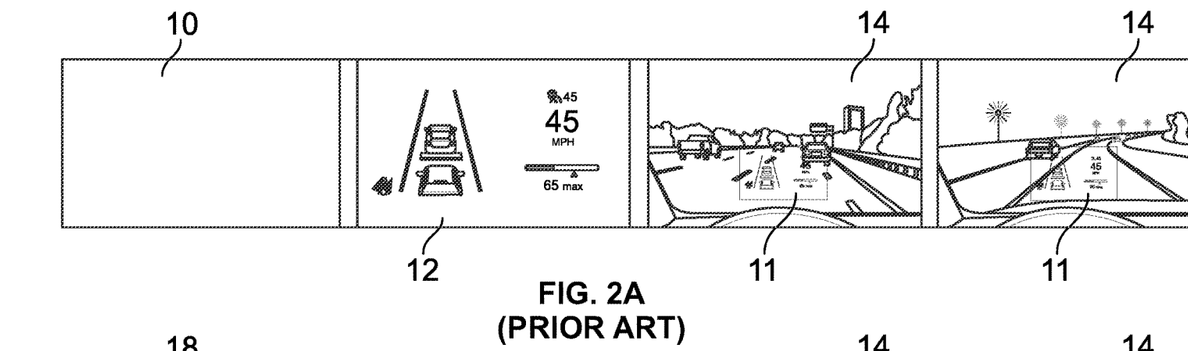
FIG. 2A is a schematic illustrating different perspectives of a HUD output without localized dimming, resulting in a display border creating a "postcard effect," according to the prior art.
Figure 2B:
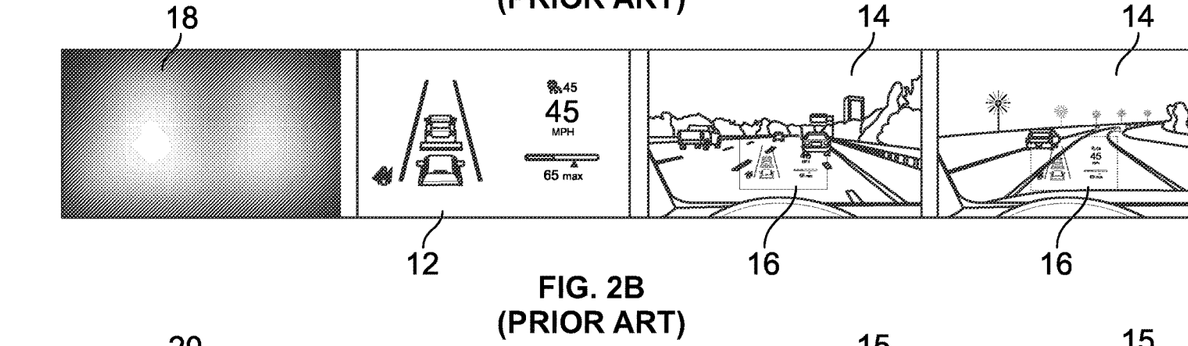
FIG. 2B is a schematic illustrating different perspectives of a HUD output with localized dimming, but without control of light bleed, resulting in a less dramatic display border but a still perceptible "postcard effect," according to the prior art.

Some HUDs 01 utilize selective operation of the light array to produce localized dimming on the LCD 32. FIG. 2A is a schematic illustrating the output of a prior art HUD 01 without localized dimming. The different perspectives exhibited by FIG. 2A illustrate an output from a HUD 01 where all of a plurality of LEDs 46 in the high-power light array 24 are activated, or on, resulting in a fully illuminated light output 10. This facilitates the projection of computerized image 12 onto the windshield 14. Lack of localized dimming results in a pronounced display boundary 11 on the windshield 14. In contrast, FIG. 2B illustrates a selectively dimmed light output 18 of the prior art. As seen in this figure, light bleed results in a display boundary 16 that is less pronounced, but still visible and distracting to the driver.

Figure 2C:
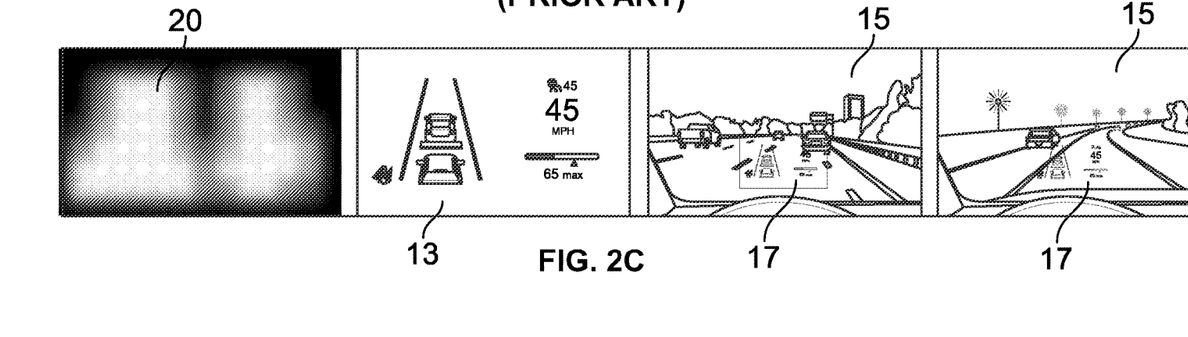
FIG. 2C is a schematic illustrating different perspectives of a HUD output with localized dimming and control of light bleed via a Fresnel lens array, provided in accordance with an embodiment of this disclosure, wherein the display border and "postcard effect" are eliminated.

To further reduce or eliminate the display boundary, the light bleed must be minimized or eliminated. FIG. 2C, provided in accordance with a preferred embodiment of the present invention, illustrates a focused light output with selective dimming 20, which results in the projection of the computerized image 13 on the windshield 15, resulting in a final image 17 without a perceivable display boundary.

As illustrated in FIG. 3, prior art systems may utilize a light array 24 comprising LEDs 46, a plurality of condenser lenses 22, a lenticular lens 26, a diffuser 30, and an LCD 32. The condenser lens 22 may be aspheric lenses that collimate light from the light array 24. Stray light 28 is reflected back to the light array 24 by the condenser lenses 22. These condenser lenses 22 are used in collaboration with the plurality of lenticular lenses 26 and may be used in collaboration with the light guiding diffuser 30 to create a uniform spread of light. However, the plurality of condenser lenses 22 are large and limit the ability of HUD units to be compact enough for packaging and use within vehicles. Moreover, because the condenser lenses 22 are large, and take up more space than some alternatives, they typically overlay multiple LEDs 46. Thus, to light up a single lens in a condenser array, multiple LEDs 46 would need to be lit, defeating the purpose of selective lighting.

FIG. 4 illustrates another proposed configuration in accordance with the prior art, wherein instead of using a plurality of lenses to focus the light, a plurality of reflectors 34 are used to focus and direct the light from the light array 24, through a light guiding diffuser 30, to the LCD 32. However, this structure results in even lower efficiency than other typical HUD systems. Furthermore, the reflectors 34 cast shadows on the image and result in a non-uniform image visible to the driver.

As shown in FIGS. 5 and 6, preferred embodiments of the present disclosure provide an imaging system that comprises a local dimming system 40 for a head up display for use in a vehicle, wherein a display-boundary is not visible on a windshield 15 or other comparable reflective surface on which a display can be provided. The local dimming system 40 preferably comprises a light array 25, a Fresnel lens array 42, a lenticular lens system 44, and an LCD 33 (the LCD 33 is not shown in FIG. 5). The lenticular lens system 44 preferably comprises at least one lenticular lens 27 and at least one light guiding diffuser 31. However, some embodiments utilize a first lenticular lens 27a and a second lenticular 27b and a diffuser 31 to facilitate a larger image presented on the LCD 33. FIGS. 5 and 6 illustrates an embodiment where the lenticular lens system 44 comprises two lenticular lenses 27a, 27b, where one functions to homogenize the light output from the Fresnel lens array 42, and the other is responsible for spreading the light across the LCD 33 in a larger image. However, in other embodiments, the lenticular lens system 44 may comprise a single lenticular lens 27 and a diffuser 31, resulting in a smaller image on the LCD 33. The light array 25 may be a high-power light array and is preferably comprised of a plurality of individual light sources 47. The Fresnel lens array 42 is operatively associated with the high-power light array 25 for receiving light produced from the high-power light array 25 to provide a collimated backlight output to produce an image on the LCD 33.

In the local dimming system 40, the Fresnel lens array 42 is preferably affixed to the light array 25 by a compressive load from a casing component such that the Fresnel lens array 42 directly overlays the light array 25 at a distance between 3 mm and 15 mm. In other embodiments, the Fresnel lens array 42 is affixed to the light array 25 by way of adhesives or screw fasteners. In preferred embodiments, the Fresnel lens array 42 is 10 mm from the light array 25. Light produced by the light array 25 thus passes through the Fresnel lens array 42 before passing through the lenticular lens system 44, before illuminating the LCD 33. The lenticular lens system (alignment feature) 44 is positioned above the Fresnel lens array 42, between the Fresnel lens array 42 and the LCD 33. In preferred embodiments, the lenticular lens system 44 is held in place by a case component 10 mm from the Fresnel lens array 42. In combination, the light array 25, Fresnel lens array 42, and lenticular lens system 44 define a light output apparatus. In some embodiments the LCD 33 is 5-22 mm from the light output apparatus and is positioned approximately 200 mm from the windshield 15. In a preferred embodiment, the light output apparatus is positioned 5-20 mm away from the LCD 33, and 220-260 mm windshield 15.

Figure 9:
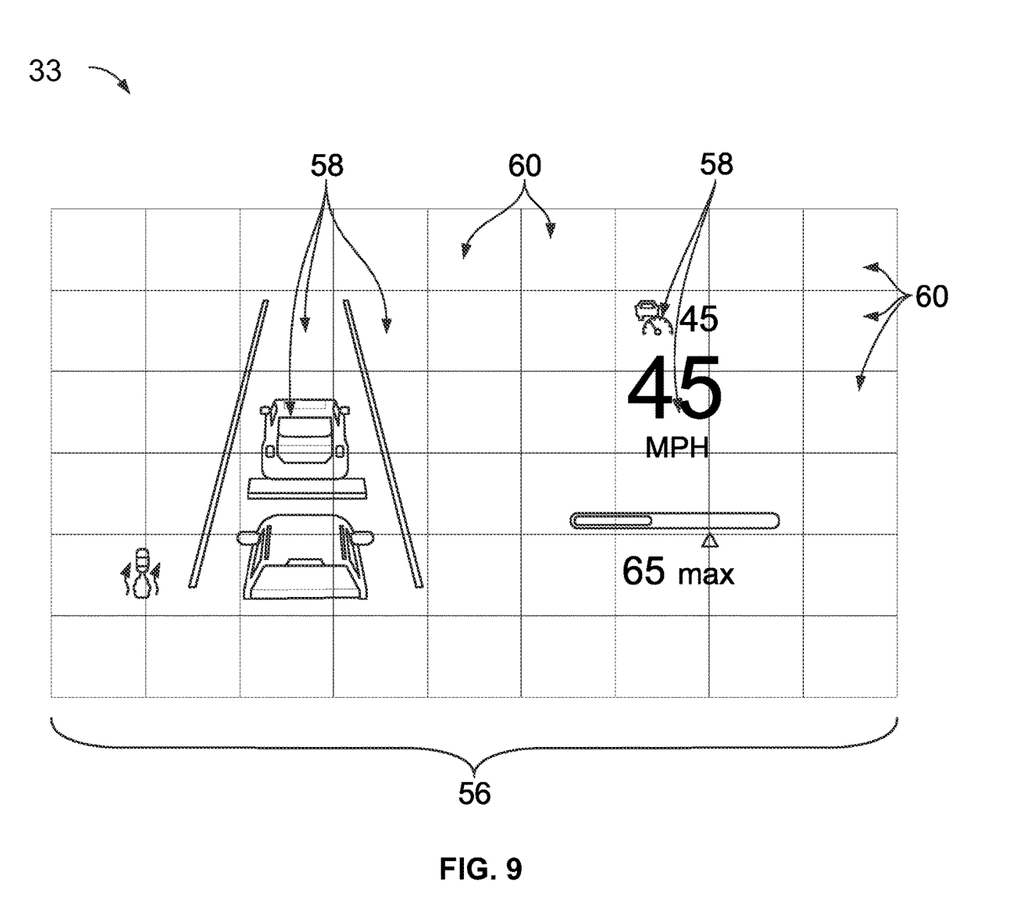
FIG. 9 is a schematic of a plurality of lighting zones of an LCD in a HUD, provided in accordance with an embodiment of the present disclosure.

The plurality of individual light sources 47 comprising the high-power light array 25 may be LEDs. However, in other embodiments, other light sources such as lasers may be used. Each of the plurality of individual light sources 47 can be selectively active or inactive, and when reflected onto the LCD 33, create a plurality of lighting zones 56 upon the LCD 33, as shown in FIG. 9. In a preferred embodiment, the number of members in the plurality of individual light sources 47 corresponds to the number of members in the plurality of lighting zones 56. However, other ratios may exist, and this disclosure is not restricted to a 1:1 ratio.

The light array is configured to facilitate a localized dimming of the collimated backlight through selective activation of the plurality of independent light sources, where members of the plurality of lighting zones operatively connected with the plurality of inactive independent light sources are dimmed and members of the plurality of lighting zones operatively connected to the active independent light sources are not dimmed. In other words, selective activation of the individual light sources 47 results in localized dimming of the backlight that produces the image projected onto the LCD 33 such that areas of the backlight that do not transmit part of the LCD 33 image are dimmed to eliminate light projected onto those lighting zones. Furthermore, the Fresnel lens array 42 collimates and focuses light produced from the active individual light sources 47 while reflecting light from neighboring active individual light sources 47 to eliminate stray light bleed.

Figure 8:
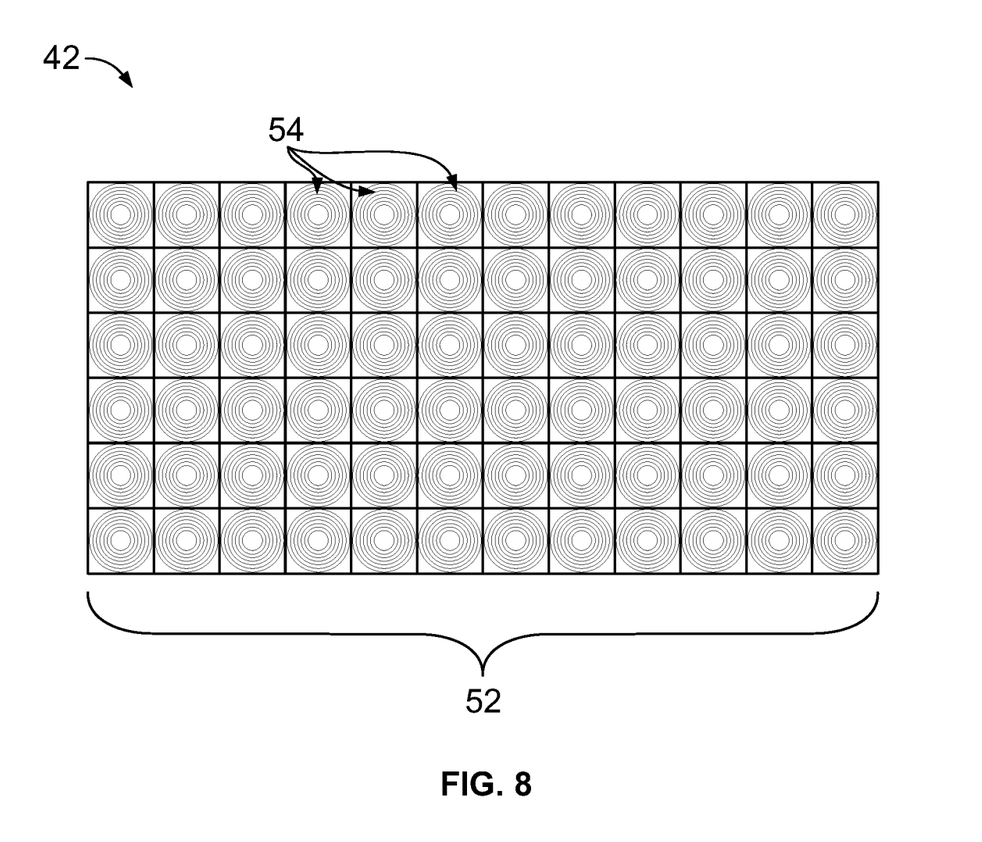
FIG. 8 is a top view of the Fresnel lens array, provided in accordance with an embodiment of the present disclosure.

In some embodiments, the Fresnel lens array 42 defines a plurality of individual Fresnel lenses 54, as illustrated in FIG. 8, and each of the plurality of individual light sources 47 is preferably associated with an individual Fresnel lens 54. The plurality of individual light sources 47, focused through the Fresnel lens array 42, defines the plurality of lighting zones 56 on the LCD 33, one for each individual light source 47 and Fresnel lens 54 pair. Thus, there is preferably a 1:1:1 ratio between the plurality of individual light sources 47 in the high-power light array 25, the plurality of Fresnel lenses 54, and the plurality of lighting zones 56. However, other ratios may exist and in other embodiments the ratio may be 2:1 or 3:1.

In a preferred embodiment the high-power light array 25 defines seventy-two individual light sources 47, paired with a seventy-two Fresnel lenses 54, resulting in seventy-two lighting zones 56 on the LCD 33. Selective activation or deactivation of the individual light sources 47 results in selective dimming of the corresponding lighting zone 60, as shown in FIG. 9.

In some embodiments, the lenticular lens system 44 defines a plurality of lenticular lenses 27. Each of the plurality of lenticular lenses 27 preferably have a diameter and a curvature. In some embodiments, the lenticular lens system 44 further comprises a light guiding diffuser 31. FIG. 6 is a perspective view of a preferred embodiment where the lenticular lens system 44 defines both a plurality of lenticular lenses 27 and a light guiding diffuser 31.

The Fresnel lens array 42 eliminates light bleed between neighboring independent light sources 47, minimizing or eliminating the display-boundary that otherwise creates a "postcard effect" in transmitted image. Furthermore, the Fresnel lens array 42 is compact, and results in a smaller package size than condenser lenses 22 such as aspheric lenses. Moreover, the use of a Fresnel lens array 42 eliminates the display-boundary without the use of reflectors 34, resulting in an image 17 without shadows on the LCD 33, minimizing or eliminating transitions between lighting zones 56, as shown in FIGS. 2C and 9. This in turn facilitates a more efficient, compact HUD with a brighter and more even image on the LCD 33, which results in a better image on windshield 15.

Figure 7:
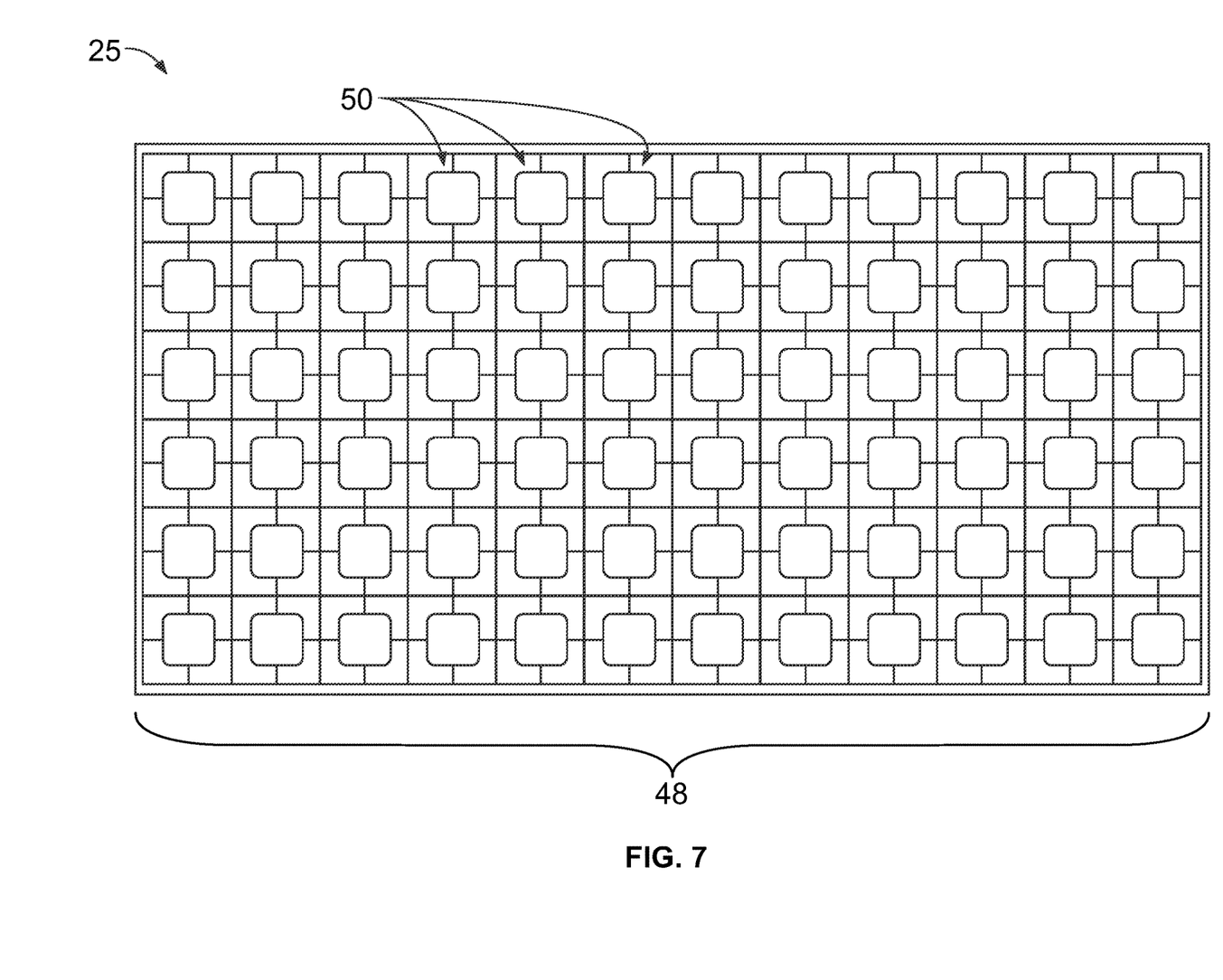
FIG. 7 is a top view of a high-power light array, provided in accordance with an embodiment of the present disclosure.

FIG. 7 is a top view of a high-power light array 24 comprising a 6×12 LED sheet 48. In preferred embodiments of the present invention, the plurality of individual light sources 47 defines a plurality of LEDs 50. However, other light sources may be used, such as a laser. In typical HUDs without selective dimming, six to eighteen LEDs are sufficient. However, with the addition of selective dimming, it is advantageous to increase the number of LEDs or other individual light sources to reduce granularity. In some embodiments, the high-power light array 25 comprises thirty-six to seventy-two LEDs 50. In a preferred embodiment, consistent with a 3.1-inch LCD 33, the high-power light array comprises seventy-two LEDs 50. In such an embodiment, the LEDs 50 are arranged in the LED sheet 48, six wide by twelve long.

In some embodiments, the LEDs 50 have a current of 70 mA. However, the brighter the LED the better the picture on the LCD, and in some embodiments the current of the LEDs 50 may be as great as 150 mA or greater. In some embodiments, the LEDs 50 may have a luminesce flux of 56 lm. In some embodiments, the LEDs 50 have a voltage of 3.0 V.

In some embodiments, the Fresnel lens array 42 defines a plurality of Fresnel lenses 54 in a Fresnel lens sheet 52. In preferred embodiments, the plurality of Fresnel lenses 54 are 10 mm FRP0510-Ø½" Fresnel Lenses which have been cut or ground to 5 mm×5 mm pieces, whereby a circumferential edge of the individual Fresnel lenses 54 are polished and glued or otherwise adhered together to define the Fresnel lens array 42. In a preferred embodiment, the plurality of Fresnel lenses 54 define a single molded piece containing the entire array. FIG. 8 is a top view of a preferred embodiment in which the Fresnel lens array 42 defines seventy-two 5 mm×5 mm Fresnel lenses adhered into a 6×12 sheet in conjunction with the 6×12 LED sheet 50, wherein each LED is associated with one Fresnel lens in the Fresnel lens array 42.

In some embodiments, the LCD is a 3.1-inch display. In further embodiments, the 3.1-inch display has a pixel pitch of 0.0855×0.0855.

FIG. 9 is a schematic of a plurality of lighting zones 56 of an LCD 33 in a HUD in accordance with a 1:1:1 ratio between the plurality of individual light sources 47, the plurality of Fresnel lenses 54, and the plurality of lighting zones 56 on the LCD 33. FIG. 9 illustrates the projection of the computerized image 12 onto the LCD 33 and a potential application of selective dimming. In this embodiment, the 1:1 association between each LED and its corresponding Fresnel Lens 54 results in seventy-two lighting zones 56 on the LCD 33. When an individual LED is inactive, it does not shine light through its associated Fresnel lens 56, and the corresponding zone 56 on the LCD 33 remains unlit. This creates lit lighting zones 58, and unlit lighting zones 60. In FIG. 9, lit lighting zones 58 have a part of the computerized image 13 presented within them due to activated LEDs. In contrast, unlit lighting zones 60 do not contain a part of the image, and the associated LEDs are inactive. The Fresnel lenses 54 associated with activated LEDs collimates the light from the associated LEDs, while the Fresnel lenses 54 associated with inactive LEDs reflects stray light back to the high-power light array, removing light blead into unlit lighting zones.

While the invention is described through the above-described exemplary embodiments, modifications to, and variations of, the illustrated embodiments may be made without departing from the inventive concepts disclosed herein. For example, although specific parameter values, such as dimensions, materials, additives and coatings, may be recited in relation to disclosed embodiments, within the scope of the invention, the values of all parameters may vary over wide ranges to suit different applications.

As used herein, including in the claims, the term "and/or," used in connection with a list of items, means one or more of the items in the list, i.e., at least one of the items in the list, but not necessarily all the items in the list. As used herein, including in the claims, the term "or," used in connection with a list of items, means one or more of the items in the list, i.e., at least one of the items in the list, but not necessarily all the items in the list. "Or" does not mean "exclusive or."

Disclosed aspects, or portions thereof, may be combined in ways not listed above and/or not explicitly claimed. In addition, embodiments disclosed herein may be suitably practiced, absent any element that is not specifically disclosed herein. Accordingly, the invention should not be viewed as being limited to the disclosed embodiments.

What is claimed is:

1. A local dimming system of a head up display (HUD), the local dimming system comprising:
    a light array;
    a Fresnel lens array;
    a lenticular lens system; and
    a liquid crystal display (LCD);
    wherein the Fresnel lens array is operatively connected to the light array, configured to receive light produced by the light array, and configured to produce a collimated backlight output;
    wherein the lenticular lens system is operatively connected to the Fresnel lens array, configured to receive the collimated backlight-output from the Fresnel lens array, and configured to transmit light to the LCD;
    wherein the LCD is configured to receive the light from the lenticular lens system and produce an image; and
    wherein the Fresnel lens array is configured to reflect stray light and eliminate light bleed, thereby reducing or eliminating a display-boundary around the image.

2. The local dimming system of claim 1, wherein the light array comprises a plurality of independent light sources which are operatively connected to a plurality of lighting zones on the LCD.

3. The local dimming system of claim 2, wherein the plurality of independent light sources are configured to be selectively active or inactive such that selective activation of the plurality of independent light sources forms a plurality of active independent light sources, a plurality of inactive independent light sources, and a plurality of neighboring active independent light sources.

4. The local dimming system of claim 3, wherein the light array is configured to facilitate a localized dimming of the collimated backlight output through the selective activation of the plurality of independent light sources, wherein members of the plurality of lighting zones operatively connected to the plurality of inactive independent light sources are dimmed and members of the plurality of lighting zones operatively connected to the active independent light sources are not dimmed.

5. The local dimming system of claim 3, wherein the Fresnel lens array is configured to decrease light bleed from the plurality of neighboring active independent light sources into the lighting zones associated with the plurality of inactive independent light sources.

6. The local dimming system of claim 2, wherein the plurality of lighting zones on the LCD is consistent with the number of independent light sources.

7. The local dimming system of claim 2, wherein the Fresnel lens array comprises a plurality of Fresnel lenses.

8. The local dimming system of claim 7, wherein there is a 1:1:1 ratio between members of the plurality of independent light sources within the light array, members of the plurality of Fresnel lenses within the Fresnel lens array, and members of the plurality of lighting zones on the LCD.

9. The local dimming system of claim 7, wherein the plurality of Fresnel lenses defines a single molded component, defining a Fresnel lens sheet.

10. The local dimming system of claim 9, wherein the Fresnel lens sheet contains 72 total Fresnel lenses with Fresnel lens sheet dimensions of 12 lenses by 6 lenses.

11. The local dimming system of claim 1, wherein the light array assembly comprises a plurality of light emitting diodes (LED).

12. The local dimming system of claim 11, wherein each of the plurality of LEDs has a current of at least 70 mA.

13. The local dimming system of claim 11, wherein each of the plurality of LEDs has a luminous flux of at least 56 lm.

14. The local dimming system of claim 11, wherein each of the plurality of LEDs has a voltage of at least 3.0V.

15. The local dimming system of claim 11, wherein the light array assembly comprises 6-72 LEDs.

16. The local dimming system of claim 15, wherein the light array assembly comprises 72 LEDs, defining 72 lighting zones on the LCD.

17. The local dimming system of claim 16, wherein the 72 LEDs are arranged in a sheet with dimensions of 12 LEDs by 6 LEDs.

18. The local dimming system of claim 1, wherein the LCD is a 3.1-inch display with pixel pitch 0.0855×0.0855.

19. The local dimming system of claim 1, wherein the lenticular lens system comprises at least one lenticular lens and a light guiding diffuser.

20. The local dimming system of claim 1, wherein the lenticular lens system comprises two lenticular lenses and a light guiding diffuser.

21. The local dimming system of claim 1, wherein the Fresnel lens array comprises a single layer of Fresnel lenses.

22. The local dimming system of claim 1, wherein light emitted from a single member of a plurality of independent light sources comprising the light array first passes through a complementary single member of a plurality of Fresnel lenses comprising the Fresnel lens array and then passes directly from the single member of the plurality of Fresnel lenses to the lenticular lens system.

* * * * *